United States Patent
Furukawa

(10) Patent No.: US 11,788,898 B2
(45) Date of Patent: Oct. 17, 2023

(54) ABNORMAL TEMPERATURE DETECTION DEVICE, ABNORMAL TEMPERATURE DETECTION METHOD, AND STORAGE MEDIUM

(71) Applicant: Yokogawa Electric Corporation, Musashino (JP)

(72) Inventor: Osamu Furukawa, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 141 days.

(21) Appl. No.: 17/401,641

(22) Filed: Aug. 13, 2021

(65) Prior Publication Data
US 2022/0065705 A1 Mar. 3, 2022

(30) Foreign Application Priority Data
Aug. 27, 2020 (JP) .................................. 2020-143271

(51) Int. Cl.
G01K 3/08 (2006.01)
G06N 20/00 (2019.01)
G01K 3/00 (2006.01)

(52) U.S. Cl.
CPC .............. *G01K 3/08* (2013.01); *G01K 3/005* (2013.01); *G06N 20/00* (2019.01); *G01K 2219/00* (2013.01)

(58) Field of Classification Search
CPC  G01K 3/08; G01K 3/005; G01K 3/10; G01K 13/00; G01K 2219/00; G06N 20/00; G08B 7/06; G08B 17/06
See application file for complete search history.

(56) References Cited

U.S. PATENT DOCUMENTS

2014/0195184 A1  7/2014 Maeda et al.
2019/0005433 A1  1/2019 Sekine

FOREIGN PATENT DOCUMENTS

| CN | 114112105 A | * | 3/2022 | ............... G01K 3/08 |
| JP | 5808605 B2 | | 11/2015 | |
| JP | 6076571 B1 | | 2/2017 | |
| JP | 2020-071137 A | | 5/2020 | |

OTHER PUBLICATIONS

English machine translation of CN 114112105 A (Year: 2022).*

* cited by examiner

*Primary Examiner* — Roy Y Yi
*Assistant Examiner* — Geoffrey T Evans
(74) *Attorney, Agent, or Firm* — Sughrue Mion, PLLC

(57) ABSTRACT

An abnormal temperature detection device includes a temperature acquirer configured to acquire temperature data, a preprocessor configured to perform preprocessing for calculating difference data indicating a difference sequence in the temperature data, generating substituted data in which either of a piece of difference data which is a positive number or a piece of difference data which is a negative number is substituted with zero, and calculating a similarity between the substituted data and reference data obtained from training data in which normality or abnormality has been identified, a learner configured to perform machine learning on the similarity calculated by the preprocessor and output an identification function, and a determiner configured to determine whether temperature data for detection acquired by the temperature acquirer and subjected to the preprocessing by the preprocessor is normal or abnormal by using the identification function.

15 Claims, 6 Drawing Sheets

ABNORMAL TEMPERATURE DETECTION DEVICE, ABNORMAL TEMPERATURE DETECTION METHOD, AND STORAGE MEDIUM

BACKGROUND

Field of the Invention

The present invention relates to an abnormal temperature detection device, an abnormal temperature detection method, and a storage medium.

Priority is claimed on Japanese Patent Application No. 2020-143271, filed on Aug. 27, 2020, the contents of which are incorporated herein by reference.

Description of Related Art

When accidents such as fires in residential buildings, fires in coal power plants, and leakage of molten steel in ironworks occur, there is a probability of loss of life and lost business opportunities. Therefore, from the viewpoint of avoiding loss of life and lost business opportunities, it is very important to detect abnormal temperatures occurring due to the occurrence of accidents. Abnormal temperatures may be used to mean temperatures considerably lower than during a normal time as well as temperatures considerably higher than during a normal time.

Japanese Patent No. 6076571, Japanese Unexamined Patent Application Publication No. 2020-071137, and Japanese Patent No. 5808605 disclose technologies of the related art for detecting abnormal states (including abnormal temperatures). For example, the technology disclosed in Japanese Patent No. 6076571 is a technology for generating reference data indicating states at normal times by dividing periodically repeated data into data of respective periods (periodic data) and averaging a plurality of pieces of periodic data. Then, abnormal states are detected based on a deviation in values between the measured periodic data and the reference data.

Incidentally, in the technology disclosed in Japanese Patent No. 6076571 described above, an abnormal state is determined when deviated values (a correlation coefficient) is greater than a predetermined allowed error (a threshold). Thus, a temporal change in temperature (an increasing or decreasing direction) may not be identified. Therefore, in the technology disclosed in Japanese Patent No. 6076571 described above, a supplement is provided so that another deviated value (a total sum of differences) is introduced to detect a direction of a change (an increase or decrease in temperature). However, when there is a contradiction between detection results in a plurality of deviated values, there is a probability of erroneous detection occurring depending on a detection algorithm.

Since a temporal change in temperature differs in accordance with a plurality of causes such in daily changes and seasonal changes, an appropriate threshold for determining whether an abnormal temperature has occurred also differs in accordance with an ambient environment or the like. In the technology disclosed in Japanese Patent No. 6076571 described above, it is necessary to adjust a threshold appropriately used for a plurality of pieces of reference data referred to in accordance with an ambient environment. Thus, it is conceivable that it may be difficult to set a threshold which is appropriate in accordance with an ambient environment and difficult to detect an abnormal temperature with high accuracy.

SUMMARY

An abnormal temperature detection device may include: a temperature acquirer configured to acquire temperature data; a preprocessor configured to perform preprocessing for calculating difference data indicating a difference sequence in the temperature data, generating substituted data in which either of a piece of difference data which is a positive number or a piece of difference data which is a negative number is substituted with zero, and calculating a similarity between the substituted data and reference data obtained from training data in which normality or abnormality has been identified; a learner configured to perform machine learning on the similarity calculated by the preprocessor and output an identification function; and a determiner configured to determine whether temperature data for detection acquired by the temperature acquirer and subjected to the preprocessing by the preprocessor is normal or abnormal by using the identification function.

Further features and aspects of the present disclosure will become apparent from the following detailed description of exemplary embodiments with reference to the attached drawings.

DETAILED DESCRIPTION OF THE EMBODIMENTS

Figure 1:
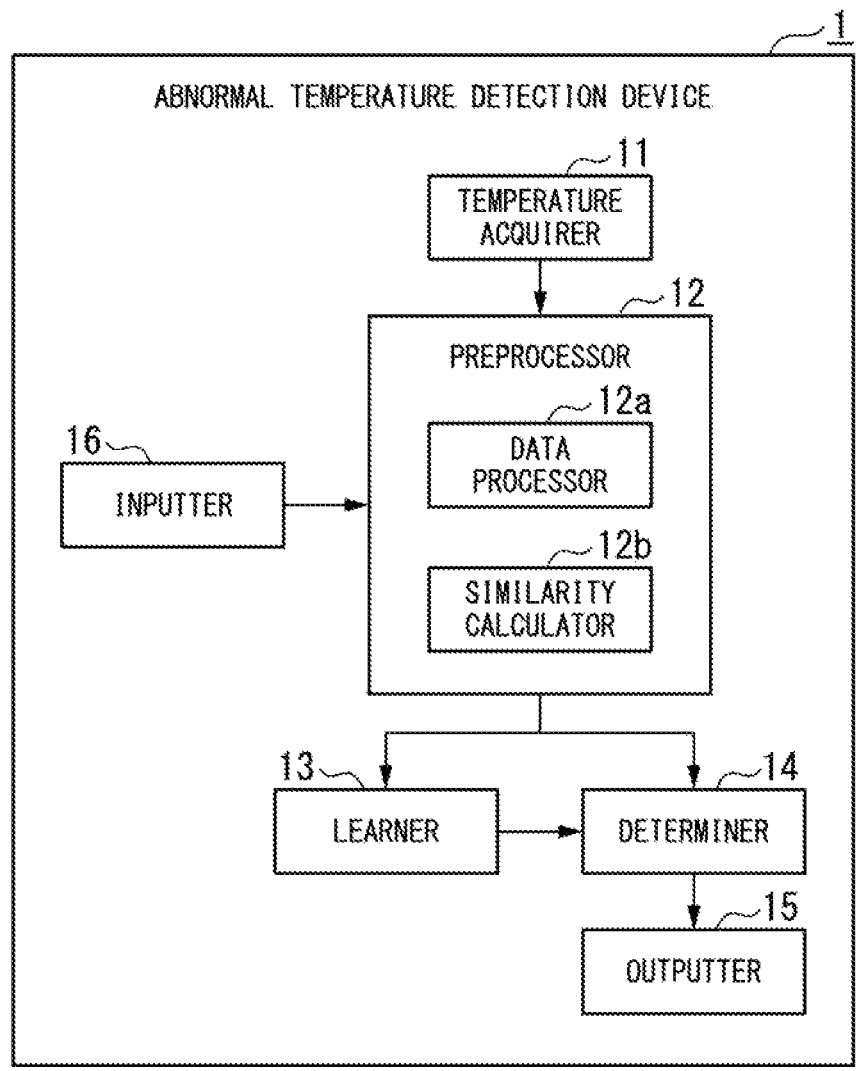
FIG. 1 is a block diagram illustrating a configuration of main units of an abnormal temperature detection device according to a first embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an abnormal temperature detection device, an abnormal temperature detection method, and a storage medium capable of detecting an abnormal temperature with high accuracy in consideration of temporal change in temperature while excluding an influence of an ambient environment.

Hereinafter, an abnormal temperature detection device, an abnormal temperature detection method, and a storage medium according to embodiments of the present invention will be described with reference to the drawings. Hereinafter, an overview of the embodiments of the present invention will first be described. Then, the details of each embodiment of the present invention will be described.

[Overview]

In the embodiments of the present invention, an abnormal temperature can be detected with high accuracy in consideration of a temporal change in temperature while excluding an influence of an ambient environment. Specifically, although a temporal change in temperature differs in accordance with a plurality of causes such as a daily change or a seasonal change, an abnormal temperature can be detected with high accuracy.

It is very difficult for a person who is unfamiliar with a mechanism of an increase in temperature to set a threshold for determining an abnormal temperature. Therefore, in the technology disclosed in Japanese Patent No. 6076571 described above, in order to detect abnormality of a facility such as a plant, it is necessary for an experienced expert worker to change and adjust reference data and set the threshold. Japanese Unexamined Patent Application, First Publication No. 2020-071137 described above discloses a method of predicting an attained temperature using a temperature change rate in order to facilitate setting of a threshold. Japanese Patent No. 5808605 described above discloses a method of associating maintenance history information of an expert worker with sensor data with linking keywords and detecting a sign of abnormality through clustering and multivariate analysis.

However, in the technology disclosed in Japanese Patent No. 6076571 described above, a temporal change direction of temperature cannot be identified with only one deviated value (a correlation function). Therefore, in order to determine an increase in temperature in fire or the like, other deviated values are necessary. In this case, when detection results are contradicted between the plurality of deviated values, there is a probability of erroneous detection occurring depending on a detection algorithm. Inherently, a temporal change in temperature differs in accordance with a plurality of causes such as a daily change or a seasonal change. Therefore, in the adjustment of the reference data disclosed in the technology disclosed in Japanese Patent No. 6076571 described above, it is difficult to adjust an appropriate threshold. Although the method disclosed in Japanese Unexamined Patent Application, First Publication No. 2020-071137 described above is used, it is difficult to set an appropriate threshold for determining whether an abnormal temperature has occurred.

In the method disclosed in Japanese Patent No. 5808605 described above, when sufficient maintenance history information of an expert worker is accumulated, an abnormal temperature is determined in consideration of a temporal change in temperature. Therefore, it can be considered that an abnormal temperature can be detected with high accuracy. However, when maintenance history information of an expert worker is not sufficient, it is difficult to detect an abnormal temperature with high accuracy.

According to an embodiment of the present invention, in a learning step, first, difference data indicating a difference sequence of the temperature data acquired by a temperature acquirer is calculated, substitution data in which one of difference data which is a positive number and difference data which is a negative number is substituted with zero is generated, and preprocessing for calculating similarity between the substitution data and reference data obtained from training data of which normality or abnormality is identified is performed. Then, machine learning is performed on the similarity calculated in the preprocessing and an identification function is obtained. Next, in a detection step, it is determined whether temperature data for detection acquired by the temperature acquirer and subjected to the preprocessing is normal or abnormal by using the identification function. In this way, it is possible to detect an abnormal temperature with high accuracy in consideration of a temporal change in temperature while excluding an influence of an ambient environment.

First Embodiment

<Abnormal Temperature Detection Device>

FIG. 1 is a block diagram illustrating a configuration of main units of an abnormal temperature detection device according to a first embodiment of the present invention. As illustrated in FIG. 1, an abnormal temperature detection device 1 according to the embodiment includes a temperature acquirer 11 (temperature acquisition means), a preprocessor 12 (preprocessing means), a learner 13 (learning means), a determiner 14 (determination means), an outputter 15, and an inputter 16 and detects an abnormal temperature. Here, an abnormal temperature is a temperature considerably increasing compared to a normal time or a temperature considerably decreasing compared to the normal time. In the embodiment, a case in which a temperature considerably increasing compared to the normal time is detected as an abnormal temperature will be described. The temperature at a normal time and an abnormal temperature are not fixed and can be changed to any temperatures depending on a situation in which the abnormal temperature detection device 1 is used.

The temperature acquirer 11 acquires temperature data which is a time-series data indicating change in temperature over time. Specifically, the temperature acquirer 11 acquires temperature data output from, for example, a temperature sensor such as a thermocouple, a resistance temperature detector, a thermistor, a crystal oscillator, an infrared thermometer, an optical fiber temperature sensor. The temperature acquirer 11 includes an analog-to-digital converter (ADC) and acquires digitized data as temperature data when an analog signal is output from the temperature sensor. The temperature data acquired by the temperature acquirer 11 may be obtained in each of sampling periods of the ADC or may be data obtained at each sampling period of the ADC and thinned out at predetermined time intervals.

As the foregoing temperature data, data divided at predefined times (for example, about every 3 to 5 minutes) and acquired over a period of a plurality of times can be used. For example, data equally divided into 3-minute data every 3 minutes for 30 minutes and obtained 10 times or data obtained as 3-minute data 28 times by sliding a data delimiter every minute within 30 minutes can be used. As temperature data for learning (hereinafter referred to as training data), temperature data generated through simulation by a user of the abnormal temperature detection device 1 may be input from the inputter 16 to the preprocessor 12 instead of being acquired by the temperature acquirer 11.

The preprocessor 12 includes a data processor 12a and a similarity calculator 12b and performs necessary signal processing (preprocessing) in advance to perform machine learning or detect an abnormal temperature on the temperature data acquired by the temperature acquirer 11. For example, the preprocessor 12 performs a noise removing process, a difference calculating process, a unit root checking process, a standardizing process, a sign substituting process, a similarity calculating process, and the like. Of the preprocessing, the difference calculating process and the sign substituting process are performed by the data processor 12a and the similarity calculating process is performed by the similarity calculator 12b. The noise removing process, the unit root checking process, and the standardizing process can be omitted as necessary.

The noise removing process is a process of removing noise superimposed on temperature data by performing filter processing such as averaging in a time axis direction on the temperature data acquired by the temperature acquirer 11. Here, the foregoing filter processing may be a process performed using a simple moving average filter, a Gaussian weighted moving average filter, a lowpass filter, a bandpass filter, a highpass filter, a median filter effective for impulse-shaped noise, a nonlinear filter, or another filter. Here, as the filter processing, it is preferable to select a filter appropriate for characteristics of noise superimposed on temperature data.

The difference calculating process is a process of calculating a difference sequence of temporal adjacent temperature data (hereinafter referred to as difference data) when the temperature data is seen as a sequence. The reason why such difference data is calculated is that a change factor such as a daily change or a seasonal change in temperature is excluded. The unit root checking process is, for example, a process of checking whether the temperature data has a unit root using an augmented Dickey-Fuller test (ADF test) or the like. The standardizing process is a process of standardizing the difference data (a process of setting an average to 0 and setting a variance to 1). The reason why such a standardizing process is performed is that in this case an influence due to deviated values on learning is reduced, a learning time is shortened, and learning costs are reduced by arranging scales of a plurality of different feature amounts handled in machine learning (feature scaling).

The sign substituting process is a process of generating substitution data in which one of difference data which is a positive number and difference data which is a negative number among the foregoing difference data is substituted with zero. When a temperature considerably increasing compared to a normal time is detected as an abnormal temperature, difference data which is a negative number (data indicating a decrease in temperature) is substituted with zero. Conversely, when a temperature considerably decreasing compared to the normal time is detected as an abnormal temperature, difference data which is a positive number (data indicating an increase in temperature) is substituted with zero. The substitution of the difference data which is a negative number (data indicating a decrease in temperature) with zero corresponds to a rectified linear unit (ReLU) of an activation function.

In this way, the reason why one of difference data which is a positive number and difference data which is a negative number among the foregoing difference data is substituted with zero is that a feature of one of an increase or a decrease of temperature is emphasized and an effect of classification in machine learning performed by the learner 13 is improved. For example, when a state in which a temperature is substantially constant is learned as a normal state, an increase or decrease in temperature is detected as abnormality because of deviation from the normal state. However, for the purpose of fire detection, for example, it is unnecessary to detect a decrease in temperature as abnormality. Therefore, an effect of classification in machine learning is improved by ignoring the decrease in temperature (substitution with zero).

The similarity calculating process is a process of calculating similarity between the substitution data generated through the sign substituting process and the reference data obtained by averaging the substitution data over a period of a plurality of times in learning. As an index indicating the similarity, an accumulated warp distance in dynamic time warping (DTW) can be used in addition to a distance between vectors (a Euclidean distance). For example, an identification label indicating whether training data is normal or abnormal is input to the preprocessor 12 when a user of the abnormal temperature detection device 1 operates the inputter 16. In a learning step, reference data when the temperature is normal is calculated from training data in which the identification label is normal and reference data when the temperature is abnormal is calculated from training data in which the identification label is abnormal. The details of the dynamic time warping (DTW) will be described in a second embodiment.

In accordance with an abnormal temperature to be detected, it can be selected whether the similarity is calculated with only training data identified as being normal, the similarity is calculated with only training data identified as being abnormal, or the similarity is calculated with both the normal training data and the abnormal training data. For example, when fire detection is performed, it is known in advance that only a direction in which a temperature increases is abnormal. Therefore, by learning both the normal training data and the abnormal training data, it is possible to perform the determination more accurately.

The learner 13 performs machine learning using a pair of the similarity calculated by the similarity calculator 12b of the preprocessor 12 and the identification label indicating whether the training data is normal or abnormal. The learner 13 preferably uses, for example, classification of a support vector machine (SVM) technology. This is because machine learning can be performed with training data less than in deep learning. The learner 13 may uses a binary classification scheme such as a logistic regression, random forest, or decision tree as the scheme of the classification. The learner 13 provides (outputs) an identification function (decision function) of enabling the classification to the determiner 14.

The determiner 14 determines whether temperature data for detection acquired by the temperature acquirer 11 and subjected to the preprocessing by the preprocessor 12 is normal or abnormal by using the identification function output from the learner 13. Here, the temperature data for detection is temperature data which is a determination target of which a temperature is abnormal and the identification label is not input. The determiner 14 outputs a determination result indicating whether the temperature data for detection is normal or abnormal to the outputter 15.

The outputter 15 outputs the determination result of the determiner 14. The outputter 15 includes, for example, a display device such as a liquid crystal display (LCD) or the like and displays the determination result of the determiner 14 so that the determination result can be viewed. The outputter 15 may include, for example, a contact terminal which can connect an alarm such as a red warning lamp or a buzzer to inform of the determination result of the determiner 14 through light or a sound in addition to the LCD. The inputter 16 includes, for example, an input device such as a keyboard or a pointing device and outputs an operation signal to the preprocessor 12 in response to an operation on the inputter 16. The outputter 15 and the inputter 16 may be integrated, for example, as in a touch panel type liquid crystal display device that has both a display function and an operation function.

The abnormal temperature detection device 1 is realized by, for example, a desktop, laptop, or tablet computer. When the abnormal temperature detection device 1 is realized by a computer, each of the blocks (the preprocessor 12, the learner 13, the determiner 14, and the like) provided in the abnormal temperature detection device 1 is realized by allowing a central processing unit (CPU) provided in the computer to execute a program (an abnormal temperature detection program) for realizing each function. That is, each of the blocks provided in the abnormal temperature detection device 1 is realized by causing software to cooperate with hardware resources.

Here, the program realizing the function of each of the blocks provided in the abnormal temperature detection device 1 may be recorded on, for example, a computer-readable recording medium such as a CD-ROM or a DVD (registered trademark)-ROM for distribution or may be distributed via a network such as the Internet. The abnormal temperature detection device 1 may be realized by hardware such as a field-programmable gate-array (FPGA), a large scale integration (LSI) circuit, or an application specific integrated circuit (ASIC).

<Abnormal Temperature Detection Method>

Next, an operation of the abnormal temperature detection device 1 will be described. Operations of the abnormal temperature detection device 1 are broadly classified into a learning-time operation performed to obtain the identification function by performing the above-described machine learning and a detection-time operation of detecting an abnormal temperature. Hereinafter, the learning-time operation of the abnormal temperature detection device 1 and the detection-time operation of the abnormal temperature detection device 1 will be described in order.

<<Learning-Time Operation>>

Figure 2:
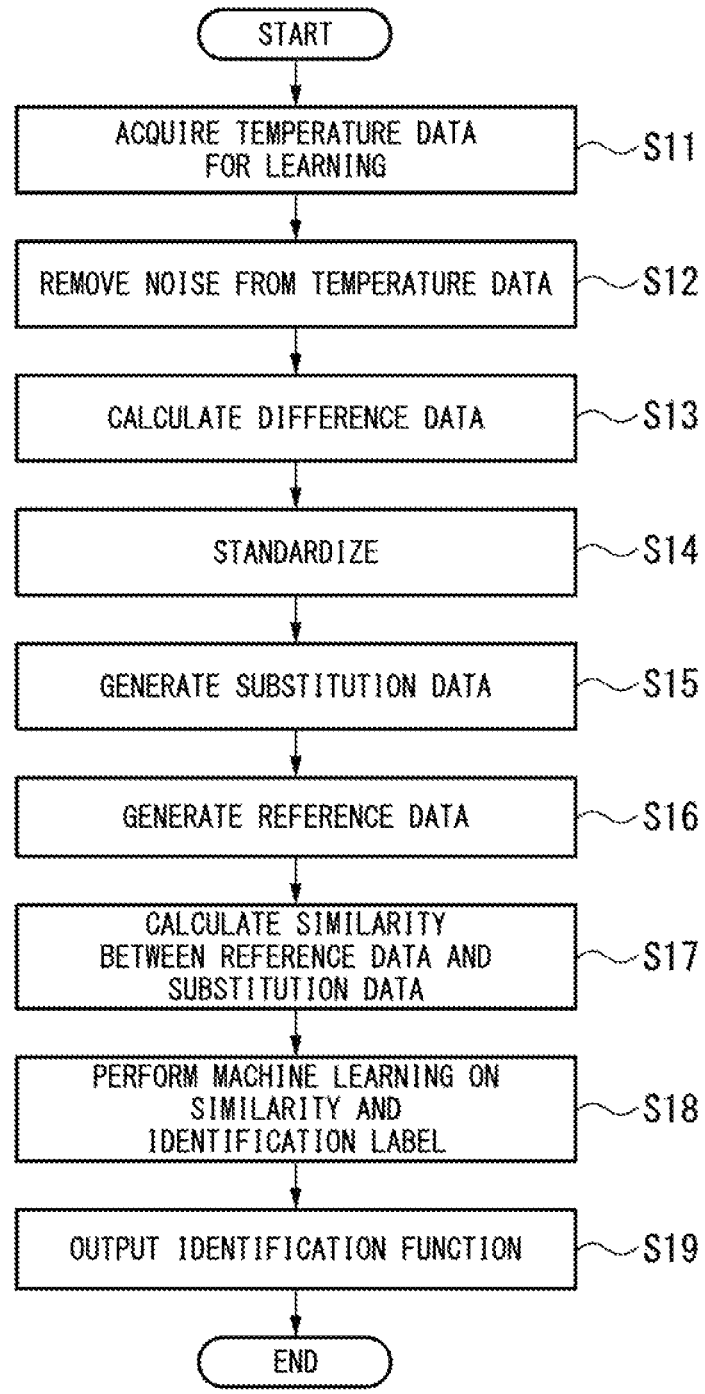
FIG. 2 is a flowchart illustrating an overview of a learning-time operation of an abnormal temperature detection device 1 according to the first embodiment of the present invention.

FIG. 2 is a flowchart illustrating an overview of the learning-time operation of the abnormal temperature detection device 1 according to the first embodiment of the present invention. A process of the flowchart illustrated in FIG. 2 starts, for example, when a user of the abnormal temperature detection device 1 gives an instruction to start machine learning by operating the inputter 16.

When the process starts, the temperature acquirer 11 first performs a process of acquiring temperature data for learning (step S11: a first temperature acquisition step). In this process, as the temperature data, a plurality of pieces of temperature data corresponding to a predefined time (for example, about 3 to 5 minutes) are acquired once or over a period of a plurality of times. In practice, for example, 100 pieces of temperature data are acquired over a period of 200 times. Alternatively, instead of the temperature acquirer 11, temperature data generated through simulation by the user of the abnormal temperature detection device 1 may be input from the inputter 16 to the preprocessor 12. The identification label indicating whether the acquired temperature data (temperature data for learning) is normal or abnormal is input to the preprocessor 12, for example, when the user of the abnormal temperature detection device 1 operates the inputter 16.

Subsequently, the preprocessor 12 performs a process of removing noise from the acquired temperature data for learning (step S12). For example, the process of removing noise superimposed on the temperature data is performed by performing filter processing such as averaging in a time-axis direction on the temperature data acquired by the temperature acquirer 11. In the filter processing, a filter appropriate for characteristics of noise superimposed on the temperature data is selected.

Subsequently, the data processor 12a of the preprocessor 12 performs a process of calculating difference data (step S13: a first preprocessing step). Specifically, a process of calculating difference data indicating a difference sequence of temporal adjacent temperature data is performed. The preprocessor 12 may perform a unit root checking process of checking whether the temperature data for learning has a unit root. Subsequently, the preprocessor 12 performs a process of standardizing the calculated difference data (step S14). Specifically, a process of setting an average of the calculated difference data to 0 and setting a variance of the calculated difference data to 1 is performed. An average value and a standard deviation obtained in this process are also used for a standardizing process in detection (step S24 of FIG. 3).

Subsequently, the data processor 12a performs a process of generating the substitution data in which one of the difference data which is a positive number and the difference data which is a negative number among the standardized difference data is substituted with zero (step S15: a first preprocessing step). In the embodiment, since the case in which a temperature considerably increasing compared to the normal time is detected as an abnormal temperature is given as an example, a process of generating the substitution data in which the difference data which is a negative number is substituted with zero is performed.

Subsequently, the preprocessor 12 performs a process of generating the reference data by averaging the substitution data corresponding to a plurality of times (for example, 200 times) (step S16). The similarity calculator 12b performs a process of calculating the similarity between the reference data and the substitution data (step S17: a first preprocessing step). For example, the process of calculating the similarity by calculating a distance between the reference data and the substitution data in accordance with dynamic time warping (DTW) is performed. The reference data obtained in this process is used for the similarity calculating process in detection (step S26 of FIG. 3). Here, as the reference data, for example, data obtained by averaging the substitution data generated from the temperature data corresponding to the predefined time (for example, about 3 to 5 minutes) over a period of a plurality of times can be used.

When the foregoing process ends, the calculated similarity and the identification label (the identification label input from the inputter 16) are set as one pair and the machine learning in which the one pair of similarity and identification label is used is performed by the learner 13 (step S18: a learning step). When the machine learning is performed, the identification function is output from the learner 13 to the determiner 14 (step S19).

The process of the flowchart illustrated in FIG. 2 may automatically end, for example, after an amount of learning preset by the user of the abnormal temperature detection device 1 is performed. Alternatively, the process may end after a time preset by the user of the abnormal temperature detection device 1 passes or may end in response to an ending instruction from the user of the abnormal temperature detection device 1. Alternatively, the process may end when a value of the identification function in predetermined time-series data becomes a predetermined value or less.

<<Detection-Time Operation>>

Figure 3:
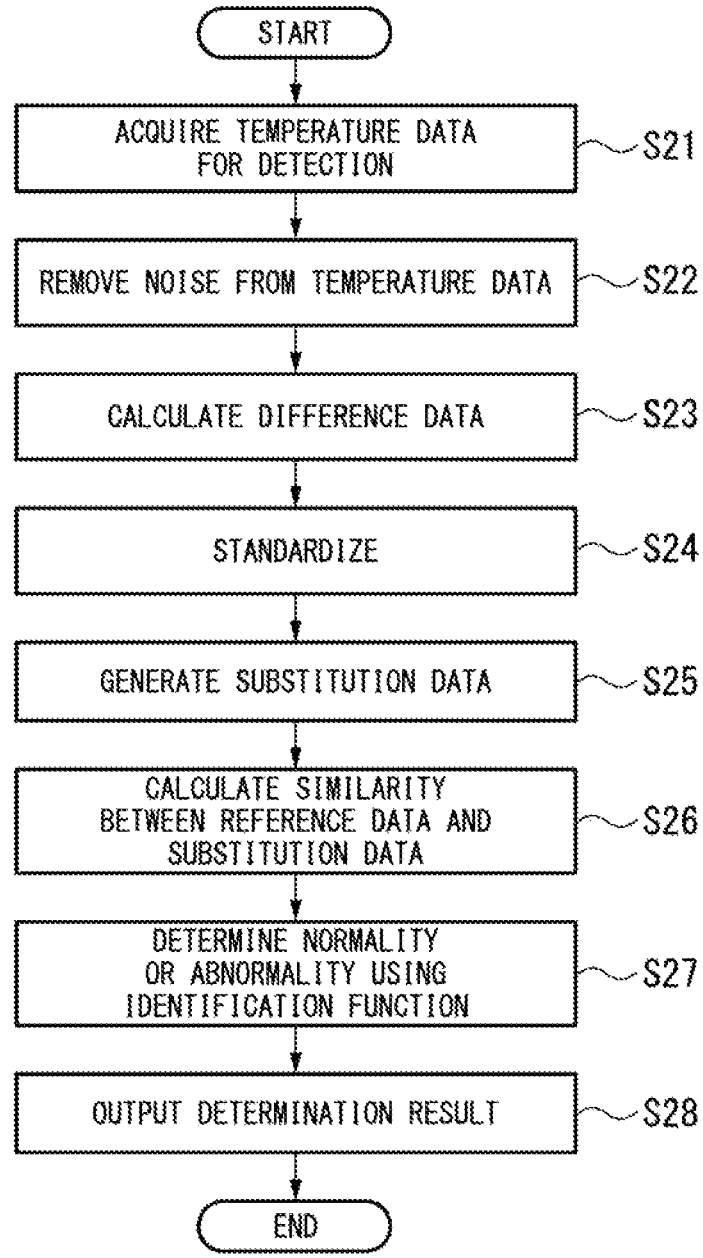
FIG. 3 is a flowchart illustrating an overview of a detection-time operation of the abnormal temperature detection device 1 according to the first embodiment of the present invention.

FIG. 3 is a flowchart illustrating an overview of a detection-time operation of the abnormal temperature detection device 1 according to the first embodiment of the present invention. A process of the flowchart illustrated in FIG. 3 starts, for example, the user of the abnormal temperature detection device 1 operates the inputter 16 and gives an instruction to start the machine learning. Alternatively, the process of the flowchart illustrated in FIG. 3 may automatically start when the process of the flowchart illustrated in FIG. 2 ends.

When the process starts, the temperature acquirer 11 first performs a process of acquiring the temperature data for detection (step S21: a second temperature acquisition step). In this process, temperature data that has the same data length as training data corresponding to a predefined time (for example, about 3 to 5 minutes) (for example, 100 pieces of temperature data) is acquired only once. Since abnormality or normality of the temperature data for detection is unknown, the identification label is not input.

Subsequently, the preprocessor 12 performs a process of removing noise from the acquired temperature data for detection (step S22). For example, a process of removing noise superimposed on the temperature data for detection is performed using a similar filter to the filter used for the process of step S13 illustrated in FIG. 2.

Subsequently, the data processor 12*a* of the preprocessor 12 performs a process of calculating difference data (step S23: a second preprocessing step). Specifically, a process of calculating difference data indicating a difference sequence of temporal adjacent temperature data is performed. Subsequently, the preprocessor 12 performs a process of standardizing the calculated difference data (step S24). Specifically, the process of standardizing the calculated difference data is performed using the average value and the standard deviation obtained in the process of step S14 illustrated in FIG. 2.

Subsequently, the data processor 12*a* performs a process of generating the substitution data in which one of the difference data which is a positive number and the difference data which is a negative number among the standardized difference data is substituted with zero (step S25: a second preprocessing step). In the embodiment, since the case in which a temperature considerably increasing compared to the normal time is detected as an abnormal temperature is given as an example, a process of generating the substitution data in which the difference data which is a negative number is substituted with zero is performed as in the process of step S15 illustrated in FIG. 2.

Subsequently, the similarity calculator 12*b* performs a process of calculating the similarity between the reference data obtained in the learning and the substitution data for detection (step S26: a second preprocessing step). For example, the process of calculating the similarity by calculating a distance between the reference data and the substitution data in accordance with dynamic time warping (DTW) is performed. Here, as the reference data, the data obtained in the process of step S16 illustrated in FIG. 2 in the learning is used.

When the foregoing process ends, the calculated similarity is input to the identification function and the determiner 14 performs a process of determining whether the temperature data for detection is normal or abnormal (step S27: a determination step). When this determination is performed, a determination result is output from the determiner 14 to the outputter 15 (step S28). Thus, information indicating whether the temperature data for detection is normal or abnormal is displayed on the display device so that the information can be viewed. Alternatively, when the temperature data for detection is determined to be abnormal, a result indicating that the temperature data for detection is abnormal is informed of through light or a sound by an alarm such as a red warning lamp or a buzzer.

The process of the flowchart illustrated in FIG. 3 may automatically end, for example, the temperature data for detection is determined to be abnormal. Alternatively, the process of the flowchart illustrated in FIG. 3 may continue in response to an instruction from the user of the abnormal temperature detection device 1 or may end in response to an ending instruction from the user of the abnormal temperature detection device 1.

As described above, in the embodiment, in the learning, first, the preprocessor 12 calculates the difference data indicating the difference sequence of the temperature data acquired by the temperature acquirer 11 or the temperature data given from the inputter 16, generates the substitution data in which one of the difference data which is a positive number and the difference data which is a negative number is substituted with zero, obtains the reference data by averaging the substitution data over a period of a plurality of times, and performs the preprocessing to calculate the similarity between the substitution data and the reference data of which normality or abnormality is identified. Then, the learner 13 performs the machine learning on the similarity calculated in the preprocessing to obtain the identification function. Subsequently, in the detection, the determiner 14 determines whether the temperature data for detection acquired by the temperature acquirer 11 and subjected to the preprocessing by the preprocessor 12 is normal or abnormal by using the identification function. Thus, it is possible to detect an abnormal temperature with high accuracy in consideration of a temporal change in temperature while excluding an influence of an ambient environment.

Second Embodiment

<Abnormal Temperature Detection Device>

Figure 4:
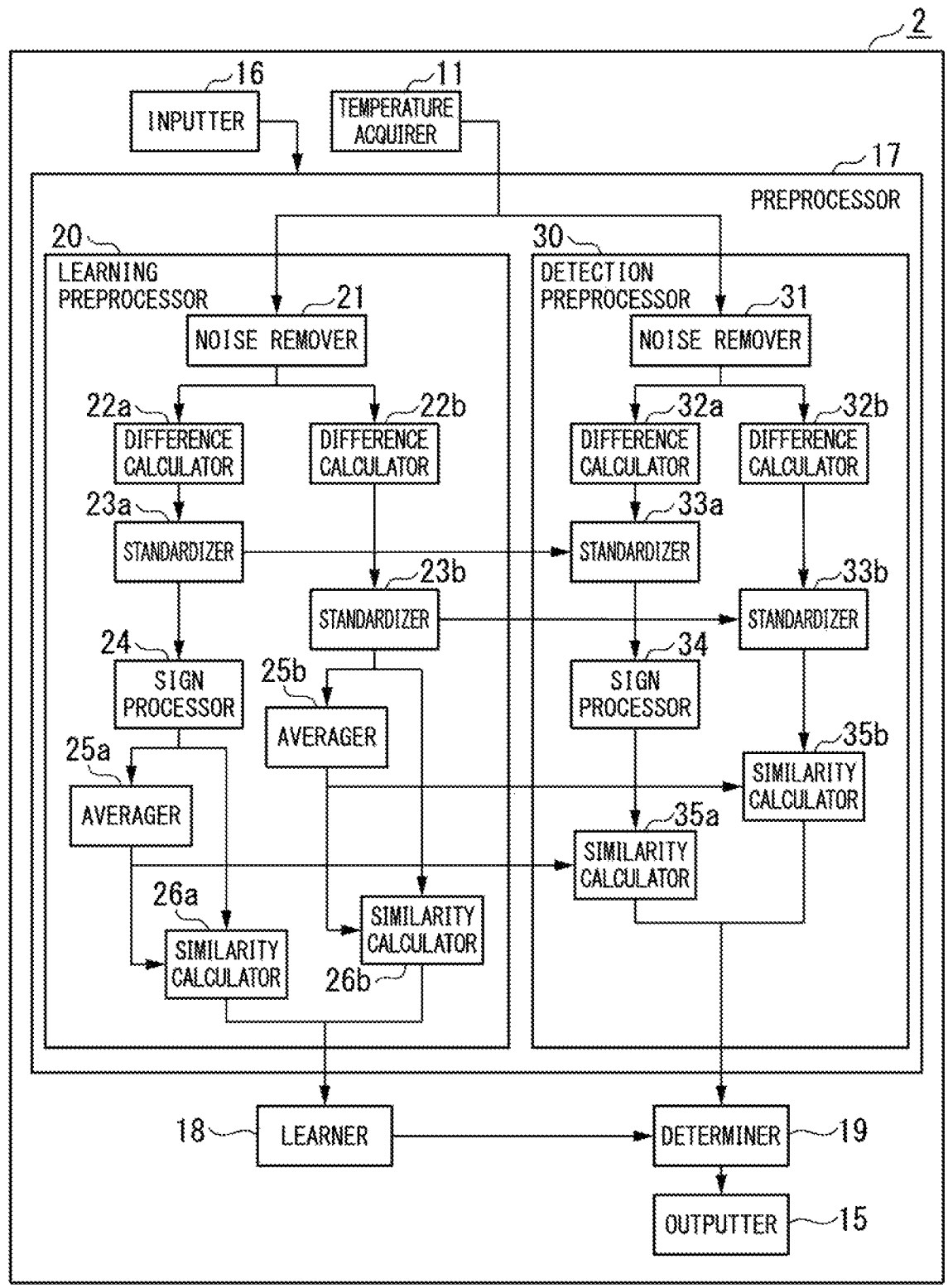
FIG. 4 is a block diagram illustrating a configuration of main units of an abnormal temperature detection device according to a second embodiment of the present invention.

FIG. 4 is a block diagram illustrating a configuration of main units of an abnormal temperature detection device according to a second embodiment of the present invention. In FIG. 4, the same reference numerals are given to the similar configurations illustrated in FIG. 1. As illustrated in FIG. 4, an abnormal temperature detection device 2 according to the embodiment has a configuration in which a preprocessor 17 (preprocessing means), a learner 18 (learning means), and a determiner 19 (determination means) are provided instead of the preprocessor 12, the learner 13, and the determiner 14 of the abnormal temperature detection device 1 illustrated in FIG. 1. The preprocessor 17 generally performs a similar process to that of the preprocessor 12 illustrated in FIG. 1 and is divided into a learning preprocessor 20 (a first preprocessor) used in learning and a detection preprocessor 30 (a second preprocessor) used in detection.

The learning preprocessor 20 includes a noise remover 21, difference calculators 22*a* and 22*b*, standardizers 23*a* and 23*b*, a sign processor 24, averagers 25*a* and 25*b*, and similarity calculators 26*a* and 26*b*. The temperature data divided at a time (for example, about 3 to 5 minutes) predefined by the temperature acquirer 11 and acquired over a period of a plurality of times and an identification label (a label indicating whether the acquired temperature data (temperature data for learning) is normal or abnormal) input from the inputter 16 are input to the learning preprocessor 20. As the temperature data for learning, temperature data generated through simulation by the user of the abnormal temperature detection device 1 may be input from the inputter 16 to the learning preprocessor 20 instead of the temperature acquirer 11.

The noise remover 21 removes noise superimposed on the temperature data by performing filter processing such as averaging in a time axis direction on the temperature data acquired by the temperature acquirer 11. Here, the foregoing filter processing may be a process performed using a simple moving average filter, a Gaussian weighted moving average filter, a lowpass filter, a bandpass filter, a highpass filter, a median filter effective for impulse-shaped noise, a nonlinear filter, or another filter as in the first embodiment. It is preferable to select a filter appropriate for characteristics of noise superimposed on temperature data. In the case of temperature measurement, a component with a high frequency may be mainly removed as noise because a temporal change in temperature is gentler than other physical amounts.

The difference calculator 22a calculates first-order difference data indicating a first-order difference sequence of the temperature data from which noise is removed by the noise remover 21. Here, the reason for calculating the first-order difference is that a change cause such as a daily change or a seasonal change in temperature is excluded as in the first embodiment. For example, when an ambient temperature is −10° C. and temperature data acquired by the temperature acquirer 11 indicates 40° C., the temperature data can be determined to be abnormal because an increase in temperature is 50° C. However, when an ambient temperature is 35° C. and temperature data acquired by the temperature acquirer 11 indicates 40° C., the temperature data can be determined to be normal because an increase in temperature is merely 5° C. In this way, since a change cause of temperature is excluded due to a change in a determination result of normality or abnormality in accordance with an absolute value of an ambient temperature, the first-order difference data is calculated.

Here, the difference calculator 22a calculates the first-order difference data. Thus, the change cause of temperature can be excluded and there is the effect of removing a unit root which is an obstacle of machine learning. Whether the temperature data acquired by the temperature acquirer 11 has a unit root can be checked using, for example, the ADF test or the like. The temperature data with no unit root is used as data for learning.

The difference calculator 22b calculates second-layer difference data indicating a second-order difference sequence of the temperature data from which noise is removed by the noise remover 21. Here, the reason for calculating the second-layer difference is that a feature indicating whether the temporal change in temperature is sharp or gentle is obtained. As illustrated in FIG. 4, the difference calculator 22b may calculate the second-layer difference data using the temperature data output from the noise remover 21 or may calculate the second-order difference data using the first-order difference data calculated by the difference calculator 22a.

The standardizer 23a performs a process of standardizing the first-order difference data calculated by the difference calculator 22a (a process of setting an average to 0 and setting a variance to 1). The standardizer 23b performs a process of standardizing the second-layer difference data calculated by the difference calculator 22b (a process of setting an average to 0 and setting a variance to 1). Here, when $x_k$ is data before standardization, $\mu_k$ is an average value of the data $x_k$, and $\sigma_k$ is a standard deviation of the data $x_k$, data $x_k'$ after standardization (data of which an average is 0 and a variance is 1) is expressed as in the following Expression (1).

[Math. 1]

$$x_k' = (x_k - \mu_k) \div \sigma_k \qquad (1)$$

In the foregoing Expression (1), the subscript k indicates the standardizer 23a in the case of k=1 and indicates the standardizer 23b in the case of k=2. An average value $\mu_1$ and a standard deviation $\sigma_1$ of data $x_1$ in the standardizer 23a are used in a standardizer 33a of a detection preprocessor 30. An average value $\mu_2$ and a standard deviation $\sigma_2$ of data $x_2$ in the standardizer 23b are used in a standardizer 33b of the detection preprocessor 30.

The sign processor 24 performs a process of generating the substitution data in which one of the difference data which is a positive number and the difference data which is a negative number among the first-order difference data standardized by the standardizer 23a is substituted with zero. When a temperature considerably increasing compared to the normal time is detected as an abnormal temperature, the sign processor 24 generates substitution data in which the first-order difference data (data indicating a decrease in temperature) which is a negative number is substituted with zero. Conversely, when a temperature considerably decreasing compared to the normal time is detected as an abnormal temperature, the sign processor 24 generates substitution data in which the difference data (data indicating a decrease in temperature) which is a positive number is substituted with zero. By ignoring one of the negative and positive numbers, it is possible to emphasize a feature of the abnormal increase or an abnormal decrease in the temperature and it is possible to improve the effect of classification in the machine learning. For example, when an increase in temperature is desired to be detected, erroneous detection can be reduced by masking and ignoring the temperature decrease side.

The averager 25a obtains first reference data by averaging the substitution data generated by the sign processor 24 over a period of a plurality of times. The averager 25b obtains second reference data by averaging the second-layer difference data standardized by the standardizer 23b over a period of a plurality of times. The first reference data obtained by the averager 25a is used in the similarity calculator 26a and the similarity calculator 35a of the detection preprocessor 30. The second reference data obtained by the averager 25b is used in the similarity calculator 26b and the similarity calculator 35b of the detection preprocessor 30. The normality or the abnormality of the first reference data and the second reference data is identified with the identification label input from the inputter 16.

The similarity calculator 26a calculates similarity between the first reference data obtained by the averager 25a and the substitution data generated by the sign processor 24. The similarity calculator 26a calculates the similarity, for example, by calculating a distance between the first reference data and the substitution data in accordance with the dynamic time warping (DTW) as in the similarity calculator 12b illustrated in FIG. 1. The similarity calculator 26b calculates similarity between the second reference data obtained by the averager 25b and the second-layer difference data standardized by the standardizer 23b. The similarity calculator 26b calculates the similarity, for example, by calculating a distance between the second reference data and the standardized second-layer difference data in accordance with the dynamic time warping (DTW) as in the similarity calculator 26a. The similarity calculated by the similarity calculators 26a and 26b and the identification label input from the inputter 16 are output to the learner 18.

Here, the details of the foregoing dynamic time warping (DTW) will be described. Now, a case in which similarity between two time waveforms f(t) and g(t) is calculated in accordance with the dynamic time warping (DTW) will be considered. Waveform data obtained by sampling the time waveforms f(t) and g(t) is assumed to be time-series data formed from N (where N is a positive number equal to or greater than 2) pieces of data. The waveform data obtained by sampling the waveform f(t) is expressed by $f_i$ (where i=1, 2, ..., N) and the waveform data obtained by sampling the waveform g(t) is expressed by $g_j$ (where j=1, 2, ..., N). The waveform data $f_i$ is, for example, the first reference data or the second reference data and the waveform data $g_j$ is, for example, the substitution data generated by the sign processor 24 or the second-layer difference data standardized by the standardizer 23b.

In the dynamic time warping (DTW), a Euclidean distance d (i, j) between the i axis and the j axis is first calculated by the following Expression (2). A mathematical symbol represented by two vertical lines in the right side of the following Expression (2) is a norm.

[Math. 2]

$$d(i,j)=\|f_i - g_j\| \quad (2)$$

An accumulated warp distance $D_A$ (i, j) of the dynamic time warping (DTW) is given in the following Expression (3). Here, a function min{ } in the following Expression (3) is an expression for selecting a minimum value of variables partitioned by a comma in a parenthesis.

[Math. 3]

$$D_A(i, j) = \begin{cases} d(i, j), & i = j = 1 \\ d(i, j) + \min\{D_A(i-1, j), D_A(i-1, j-1), D_A(i, j-1)\}, & i > 0, j > 0 \\ \infty, & \text{others} \end{cases} \quad (3)$$

The accumulated warp distance $D_A$ (i, j) is first started at i=j=1 and then is calculated in sequence while changing i and j. Specifically, $D_A$ (i, j) is calculated by adding a minimum value of the Euclidean distance d (i, j) at (i, j), and $D_A$ (i-1, j), $D_A$ (i-1, j-1), and $D_A$ (i, j-1). An accumulated warp distance $D_A$ (N, N) finally obtained by performing this calculation is an accumulated warp distance of DTW. The accumulated warp distance of DTW decreases as the waveform data $f_i$ is more similar to the waveform $g_j$, and increases as the waveform data $f_i$ is not more similar to the waveform $g_j$.

The detection preprocessor 30 includes a noise remover 31, difference calculators 32a and 32b, standardizers 33a and 33b, a sign processor 34, and similarity calculators 35a and 35b. The temperature data (temperature data for detection) corresponding to a predefined time (for example, about 3 to 5 minutes) acquired by the temperature acquirer 11 is input to the detection preprocessor 30 only once. The identification label is not input from the inputter 16 to the detection preprocessor 30 unlike the learning preprocessor 20.

The noise remover 31 removes noise superimposed on the temperature data by performing filter processing such as averaging in a time axis direction on the temperature data acquired by the temperature acquirer 11. The filter processing performed by the noise remover 31 is similar to the filter processing performed by the noise remover 21 of the learning preprocessor 20.

The difference calculator 32a calculates first-order difference data indicating a first-order difference sequence of the temperature data from which noise is removed by the noise remover 31. The difference calculator 32b calculates second-layer difference data indicating a second-order difference sequence of the temperature data from which noise is removed by the noise remover 31. A method of calculating the differences in the difference calculators 32a and 32b is the same as the method of calculating the differences in the difference calculators 22a and 22b provided in the learning preprocessor 20.

The standardizer 33a performs a process of standardizing the first-order difference data calculated by the difference calculator 32a. The standardizer 33b performs a process of standardizing the second-layer difference data calculated by the difference calculator 32b. Specifically, the standardizer 33a performs the process of standardizing the first-order difference data calculated by the difference calculator 32a using the average value $\mu_1$ and the standard deviation $\sigma_1$ in the standardizer 23a of the learning preprocessor 20. The standardizer 33b performs the process of standardizing the second-layer difference data calculated by the difference calculator 32b using the average value $\mu_2$ and the standard deviation $\sigma_2$ in the standardizer 23b of the learning preprocessor 20.

Here, $x_3$ is data before standardization input to the standardizer 33a and $x_4$ is data before standardization input to the standardizer 33b. Data $x_3$' after standardization output from the standardizer 33a and data $x_4$' after standardization output from the standardizer 33b are expressed in the following Expression (4).

[Math. 4]

$$x_3' = (x_3 - \mu_1) \div \sigma_1$$

$$x_4' = (x_4 - \mu_2) \div \sigma_2 \quad (4)$$

The sign processor 34 performs a process of generating the substitution data in which one of the difference data which is a positive number and the difference data which is a negative number among the first-order difference data standardized by the standardizer 33a is substituted with zero. When a temperature considerably increasing compared to a temperature indicating a normal state is detected as an abnormal temperature, the sign processor 34 generates substitution data in which the first-order difference data (data indicating a decrease in temperature) which is a negative number is substituted with zero. Conversely, when a temperature considerably decreasing compared to a temperature indicating a normal state is detected as an abnormal temperature, the sign processor 24 generates substitution data in which the difference data (data indicating an increase in temperature) which is a positive number is substituted with zero. The sign processor 34 is similar to the sign processor 24 of the learning preprocessor 20.

The similarity calculator 35a calculates similarity between the first reference data obtained by the averager 25a of the learning preprocessor 20 and the substitution data generated by the sign processor 34. The similarity calculator 35b calculates similarity between the second reference data obtained by the averager 25b of the learning preprocessor 20 and the second-layer difference data standardized by the standardizer 33b. The method of calculating the similarity in each of the similarity calculators 35a and 35b is similar to the method of calculating the similarity in each of the similarity calculators 26a and 26b of the learning preprocessor 20. The similarity calculated by the similarity calculators 35a and 35b is output to the determiner 19.

The learner 18 performs machine learning using one pair of the similarity calculated by the similarity calculators 26a and 26b of the learning preprocessor 20 and the identification label indicating normality or abnormality of the first reference data and the second reference data. The learner 18 can use a similar scheme to the scheme of classification used in the learner 13 illustrated in FIG. 1. The learner 18 supplies (outputs) the identification function of enabling the classification to the determiner 19.

The determiner 19 determines whether temperature data for detection acquired by the temperature acquirer 11 and subjected to the preprocessing by the preprocessor 17 is normal or abnormal by using the identification function output from the learner 18. For example, when the learner 18 learns a normal cluster as −1 and an abnormal cluster as 1 using a support vector machine (SVM), the obtained identification function means that a negative side is normal and a positive side is abnormal at a boundary of 0. The determiner 19 determines normality or abnormality, for example, using such an identification function. The determiner 19 outputs a determination result indicating whether the temperature data for detection is normal or abnormal to the outputter 15.

Figure 5:
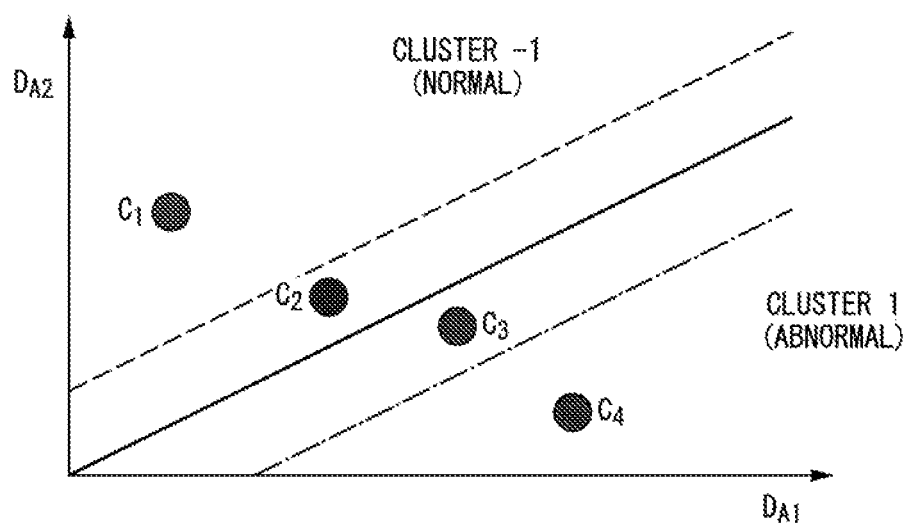
FIG. 5 is a diagram illustrating a determination method performed using an identification function in the abnormal temperature detection device according to the second embodiment of the present invention.

FIG. 5 is a diagram illustrating a determination method performed using the identification function in the abnormal temperature detection device according to the second embodiment of the present invention. In the graph illustrated in FIG. 5, the horizontal axis represents the similarity (an accumulated warp distance $D_{A1}$) calculated by the similarity calculator 35a of the detection preprocessor 30 and the vertical axis represents the similarity (an accumulated warp distance $D_{A2}$) calculated by the similarity calculator 35b. In the graph illustrated in FIG. 5, a dotted line indicates a position at which a value of the identification function is −1, a solid line indicates a position at which a value of the identification function is 0, and a one-dot chain line indicates a position at which a value of the identification function is 1. At points C1 and C2 in FIG. 5, values of the identification function are on the negative side. Therefore, the determiner 19 determines that the values are normal. Conversely, at points C3 and C4, values of the identification function are on the positive side. Therefore, the determiner 19 determines that the values are abnormal.

In the support vector machine (SVM), there are various kinds of kernels such as a linear kernel, a polynomial kernel, and a Gaussian kernel (radial basis function (RBF) kernel). In the example illustrated in FIG. 5, a linear kernel is used.

The abnormal temperature detection device 2 is realized by, for example, a desktop, laptop, or tablet computer as in the abnormal temperature detection device 1 illustrated in FIG. 1. When the abnormal temperature detection device 2 is realized by a computer, each of the blocks (the preprocessor 17, the learner 18, the determiner 19, and the like) provided in the abnormal temperature detection device 2 is realized by allowing a central processing unit (CPU) provided in the computer to execute a program (an abnormal temperature detection program) for realizing each function. That is, each of the blocks provided in the abnormal temperature detection device 2 is realized by causing software to cooperate with hardware resources. The abnormal temperature detection device 2 may be realized by hardware such as a field-programmable gate-array (FPGA), a large scale integration (LSI) circuit, or an application specific integrated circuit (ASIC).

<Abnormal Temperature Detection Method>

Next, an operation of the abnormal temperature detection device 2 will be described. Operations of the abnormal temperature detection device 2 are broadly classified into a learning-time operation performed to obtain the identification function by performing the machine learning and a detection-time operation of detecting an abnormal temperature as in the abnormal temperature detection device 1. The operations of the abnormal temperature detection device 2 are basically similar to the operations of the abnormal temperature detection device 1. Hereinafter, the learning-time operation of the abnormal temperature detection device 2 and the detection-time operation of the abnormal temperature detection device 2 will be described in order with reference to FIGS. 2 and 3.

<<Learning-Time Operation>>

When the process starts, the temperature acquirer 11 performs a process of acquiring the temperature data for learning (step S11: a first temperature acquisition step). For example, 100 pieces of temperature data corresponding to a predefined time (for example, about 3 to 5 minutes) are acquired over a period of 200 times. Alternatively, instead of the temperature acquirer 11, temperature data generated through simulation by the user of the abnormal temperature detection device 2 may be input from the inputter 16 to the learning preprocessor 20. The identification label indicating whether the acquired temperature data (temperature data for learning) is normal or abnormal is input to the learning preprocessor 20, for example, when the user of the abnormal temperature detection device 2 operates the inputter 16, as in the first embodiment.

Subsequently, the noise remover 21 of the learning preprocessor 20 performs a process of removing noise from the acquired temperature data for learning (step S12). In the processing, as in the first embodiment, a filter appropriate for characteristics of noise superimposed on the temperature data is selected. Subsequently, the difference calculators 22a and 22b of the learning preprocessor 20 respectively perform a process of calculating the first-order difference data and the second-layer difference data (step S13: a first preprocessing step). The learning preprocessor 20 may perform a unit root checking process of checking whether the temperature data has a unit root.

Subsequently, the standardizers 23a and 23b respectively perform a process of standardizing the calculated first-order difference data and second-layer difference data (step S14). Specifically, the standardizers 23a and 23b respectively perform a process of setting an average of the calculated first-order difference data and second-layer difference data to 0 and setting a variance of the calculated first-order difference data and second-layer difference data to 1 is performed. The average value $\mu_1$ and the standard deviation $\sigma_1$ used for the standardization of the standardizer 23a are output to the standardizer 33a of the detection preprocessor 30, and the average value $\mu_2$ and the standard deviation $\sigma_2$ used for the standardization of the standardizer 23b are output to the standardizer 33b of the detection preprocessor 30.

Subsequently, the sign processor 24 performs a process of generating the substitution data in which one of the first-order difference data which is a positive number and the first-order difference data which is a negative number among the standardized first-order difference data is substituted with zero (step S15: a first preprocessing step). In the embodiment, since the case in which a temperature considerably increasing compared to a temperature indicating a normal state is detected as an abnormal temperature is given as an example, a process of generating the substitution data in which the difference data which is a negative number is substituted with zero is performed.

Subsequently, the averager 25a performs a process of obtaining the first reference data by averaging the substitution data generated by the sign processor 24 over a period of a plurality of times. The averager 25b performs a process of obtaining the second reference data by averaging the second-layer difference data standardized by the standardizer 23b over a period of a plurality of times (step S16). The first reference data obtained by the averager 25a is output to the similarity calculator 26a and the similarity calculator 35a of the detection preprocessor 30. The second reference data obtained by the averager 25b is output to the similarity calculator 26b and the similarity calculator 35b of the detection preprocessor 30.

Subsequently, the similarity calculator 26a performs a process of calculating similarity between the first reference data obtained by the averager 25a and the substitution data generated by the sign processor 24. The similarity calculator 26b performs a process of calculating similarity between the second reference data obtained by the averager 25b and the second-layer difference data standardized by the standardizer 23b (step S17: a first preprocessing step). As the similarity, calculation of a distance in accordance with the dynamic time warping (DTW) may be used in addition to a distance between vectors (a Euclidean distance).

When the foregoing process ends, the similarity calculated by the similarity calculators 26a and 26b and the identification label indicating normality or abnormality of the first reference data and the second reference data are set as one pair and the machine learning in which the one pair of similarity and identification label is used is performed by the learner 18 (step S18: a learning step). When the machine learning is performed, the identification function is output from the learner 18 to the determiner 19 (step S19). The learning-time operation ends, for example, in accordance with a similar method to that of the first embodiment.

<<Detection-Time Operation>>

When the process starts, the temperature acquirer 11 first performs a process of acquiring the temperature data for detection (step S21: a second temperature acquisition step). In this process, temperature data that has the same data length as the first reference data and the second reference data corresponding to a predefined time (for example, about 3 to 5 minutes) (for example, 100 pieces of temperature data) is acquired only once. Since abnormality or normality of the temperature data for detection is unknown, the identification label is not input.

Subsequently, the noise remover 31 of the detection preprocessor 30 performs a process of removing noise from the acquired temperature data for detection (step S22). In this process, as in step S12 illustrated in FIG. 2, a filter appropriate for characteristics of noise superimposed on the temperature data is selected. Subsequently, the difference calculators 32a and 32b of the detection preprocessor 30 perform a process of calculating the first-order difference data and the second-layer difference data (step S23: a second preprocessing step).

Subsequently, the standardizer 33a and 33b respectively perform a process of standardizing the calculated first-order difference data and the second-layer difference data (step S24). Specifically, the standardizer 33a performs the process of standardizing the first-order difference data calculated by the difference calculator 32a using the average value $\mu_1$ and the standard deviation $\sigma_1$ in the standardizer 23a of the learning preprocessor 20. The standardizer 33b performs the process of standardizing the second-layer difference data calculated by the difference calculator 32b using the average value $\mu_2$ and the standard deviation $\sigma_2$ in the standardizer 23b of the learning preprocessor 20.

Subsequently, the sign processor 34 performs a process of generating the substitution data in which one of the difference data which is a positive number and the difference data which is a negative number among the standardized first-order difference data is substituted with zero (step S25: a second preprocessing step). In the embodiment, since the case in which a temperature considerably increasing compared to a temperature indicating a normal state is detected as an abnormal temperature is given as an example, a process of generating the substitution data in which the difference data which is a negative number is substituted with zero is performed as in the process of step S15 illustrated in FIG. 2.

Subsequently, the similarity calculator 35a performs a process of calculating similarity between the first reference data output by the averager 25a and the substitution data generated by the sign processor 34. The similarity calculator 35b performs a process of calculating similarity between the second reference data obtained by the averager 25b and the second-layer difference data standardized by the standardizer 33b (step S26: a second preprocessing step). As the similarity, calculation of a distance in accordance with the dynamic time warping (DTW) may be used in addition to a distance between vectors (a Euclidean distance).

When the foregoing process ends, the calculated similarity is input to the identification function and the determiner 19 performs a process of determining whether the temperature data for detection is normal or abnormal (step S27: a determination step). When this determination is performed, a determination result is output from the determiner 19 to the outputter 15 (step S28). Thus, information indicating whether the temperature data for detection is normal or abnormal is displayed on the display device so that the information can be viewed. Alternatively, when the temperature data for detection is determined to be abnormal, a result indicating that the temperature data for detection is abnormal is informed of through light or a sound by an alarm such as a red warning lamp or a buzzer. The detection-time operation ends, for example, in accordance with a similar method to that of the first embodiment.

As described above, in the embodiment, in the learning, first, the learning preprocessor 20 calculates the first-order difference data and the second-layer difference data of temperature data acquired by the temperature acquirer 11 or the temperature data given from the inputter 16, generates the substitution data in which one of the first-order difference data which is a positive number and the first-order difference data which is a negative number is substituted with zero, obtains the first reference data and the second reference data by averaging the substitution data over a period of a plurality of times, and performs the preprocessing to calculate the similarity between the substitution data and the first reference data of which normality or abnormality is identified and the similarity between the second reference data and the substitution data. Then, the learner 18 performs the machine learning on the similarity calculated in the preprocessing to obtain the identification function. Subsequently, in the detection, the determiner 19 determines whether the temperature data for detection acquired by the temperature acquirer 11 and subjected to the preprocessing by the detection preprocessor 30 is normal or abnormal by using the identification function. Thus, it is possible to detect an abnormal temperature with high accuracy in consideration of a temporal change in temperature while excluding an influence of an ambient environment.

Third Embodiment

<Abnormal Temperature Detection Device>

Figure 6:
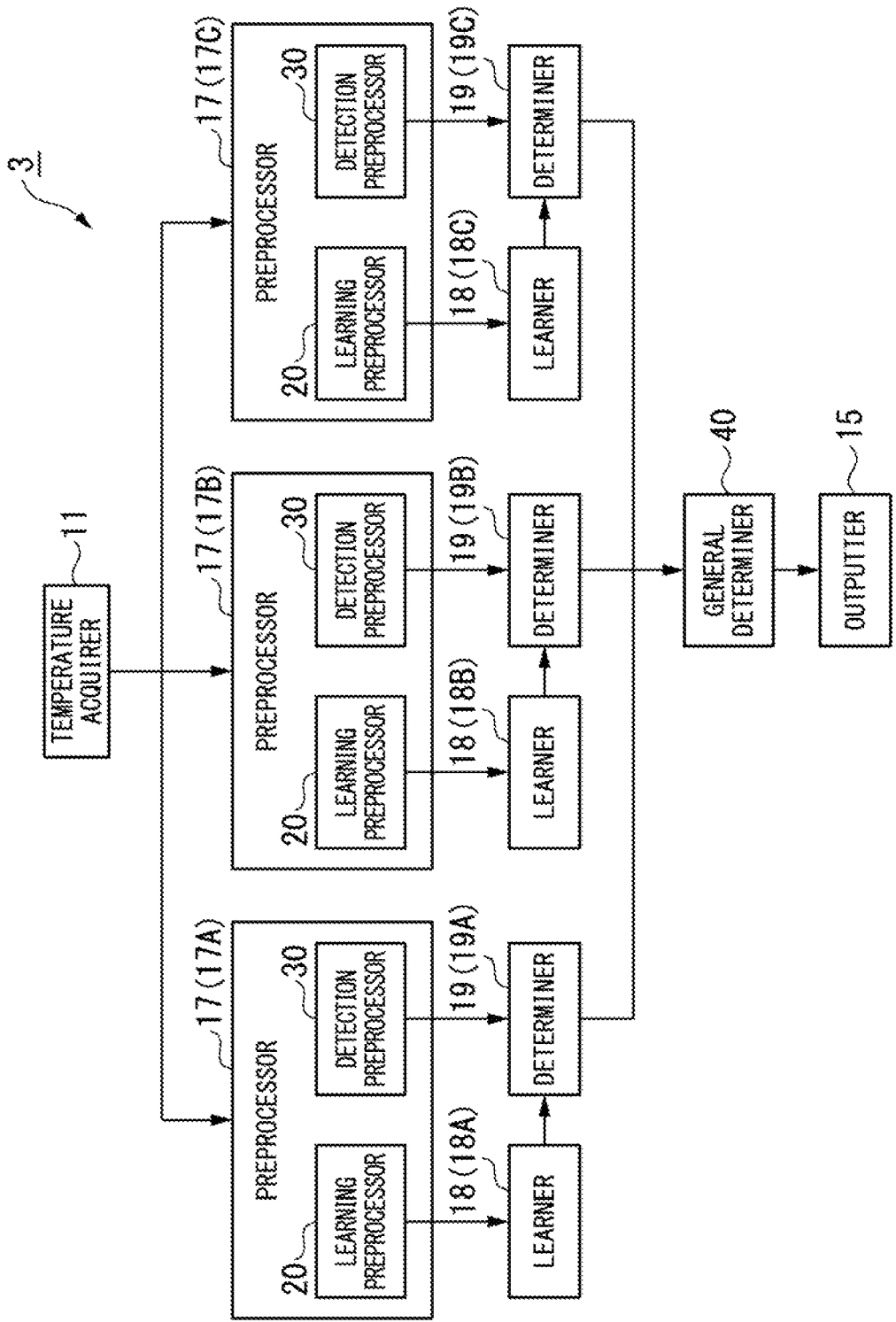
FIG. 6 is a block diagram illustrating a configuration of main units of an abnormal temperature detection device according to a third embodiment of the present invention.

FIG. 6 is a block diagram illustrating a configuration of main units of an abnormal temperature detection device according to a third embodiment of the present invention. In FIG. 6, the same reference numerals are given to the similar configurations illustrated in FIG. 4. As illustrated in FIG. 6, an abnormal temperature detection device 3 according to the embodiment has a configuration in which a plurality of sets of the preprocessor 17, the learner 18, and the determiner 19 (three sets in the example illustrated in FIG. 6) of the abnormal temperature detection device 2 illustrated in FIG. 4 are provided.

The temperature acquirer 11 outputs the acquired temperature data to each preprocessor 17 (preprocessors 17A to 17C). That is, the same temperature data acquired by the temperature acquirer 11 is input to each preprocessor 17 (the preprocessors 17A to 17C). The preprocessors 17A to 17C are similar to the preprocessor described in the second embodiment and each include the learning preprocessor 20 and the detection preprocessor 30. Here, the preprocessors 17A to 17C may calculate the similarity using mutually different training data.

For example, the preprocessor 17A calculates the similarity using the temperature data changed due to a gentle increase in the temperature after a sharp increase in the temperature as training data. The preprocessor 17B calculates the similarity using the temperature data linearly increasing at a constant inclination as training data. The preprocessor 17C calculates the similarity using the temperature data increasing exponentially after start of a gentle increase in temperature as training data. The learners 18A to 18C corresponding to the preprocessors 17A to 17C can obtain mutually different identification functions by calculating the similarity using the different training data. The determiners 19A to 19C corresponding to the learners 18A to 18C perform the determination using mutually different identification functions.

A general determiner 40 determines whether the temperature data for detection is normal or abnormal based on determination results of the determiners 19A to 19C. The general determiner 40 determines whether the temperature data for detection is normal or abnormal, for example, in accordance with the following algorithm (scheme):

a majority rule scheme (no weighting or weighting);
a round robin scheme (a cyclic scheme);
random selection scheme;
a logical sum scheme (for example, determining abnormality when even one of determination results is abnormal);
a logical product scheme (for example, determining normality when even one of determination results is normal); and a machine learning scheme (the general determiner 40 has a function of performing machine learning of the determination results and a determination).

As described in Description of Related Art, when results of a plurality of determiners are contradicted, there is a probability of erroneous detection occurring depending on a detection algorithm of the general determiner 40. However, as exemplified above, a shape of an increase waveform of temperature is identified and usefully used for determination in detail without erroneous detection of an abnormal increase in temperature.

The outputter 15 outputs the determination result of the general determiner 40. The outputter 15 displays the determination result of the general determiner 40 so that the determination result can be viewed on a display device. The outputter 15 may inform of a determination result of the general determiner 40 through light or a sound. The outputter 15 may output the determination results of the determiners 19A to 19C together in addition to the determination result of the general determiner 40.

The abnormal temperature detection device 3 is realized by, for example, a desktop, laptop, or tablet computer as in the abnormal temperature detection device 2 illustrated in FIG. 4. When the abnormal temperature detection device 3 is realized by a computer, each of the blocks (the preprocessor 17, the learner 18, the determiner 19, and the like) provided in the abnormal temperature detection device 3 is realized by allowing a central processing unit (CPU) provided in the computer to execute a program (an abnormal temperature detection program) for realizing each function. That is, each of the blocks provided in the abnormal temperature detection device 3 is realized by causing software to cooperate with hardware resources. The abnormal temperature detection device 3 may be realized by hardware such as a field-programmable gate-array (FPGA), a large scale integration (LSI) circuit, or an application specific integrated circuit (ASIC).

<Abnormal Temperature Detection Method>

Next, an operation of the abnormal temperature detection device 3 will be described. Operations of the abnormal temperature detection device 3 are broadly classified into a learning-time operation performed to obtain the identification function by performing the machine learning and a detection-time operation of detecting an abnormal temperature as in the abnormal temperature detection device 2. Here, in the abnormal temperature detection device 3, learning-time operations are performed in parallel by the preprocessors 17A and the learner 18A, the preprocessors 17B and the learner 18B, and the preprocessors 17C and the learner 18C. In the abnormal temperature detection device 3, detection-time operations are performed in parallel by the preprocessor 17A and the determiner 19A, the preprocessor 17B and the determiner 19B, and the preprocessor 17C and the determiner 19C. Then, based on determination results of the determiners 19A to 19C, the general determiner 40 performs a process of determining whether the temperature data for detection is normal or abnormal.

As described above, according to the embodiment, in the learning, the three preprocessors 17A to 17C and the three learners 18A to 18C first perform the preprocessing and the machine learning to obtain the identification function as in the second embodiment. Next, in the detection, the three preprocessors 17A to 17C and the three determiners 19A to 19C perform the preprocessing and the determination using the identification function to determine whether the temperature data for detection is normal or abnormal as in the second embodiment. Then, based on the determination results of the determiners 19A to 19C, the general determiner 40 finally determines whether the temperature data for detection is normal or abnormal. Thus, it is possible to detect an abnormal temperature with high accuracy in consideration of a temporal change in temperature while excluding an influence of an ambient environment.

The abnormal temperature detection device, the abnormal temperature detection method, and the abnormal temperature detection program according to the embodiments of the present invention have been described above, but the present invention can be changed freely within the scope of the present invention without being limited to the foregoing embodiments. For example, since the abnormal temperature detection devices 1 to 3 according to the above-described first to third embodiments include the learners (the learners 13 and 18) and the determiners (the determiners 14 and 19), the machine learning may be performed to automatically update the identification function (automatic learning) while determining whether the temperature data for detection is normal or abnormal. By performing automatic updating of the learners, the abnormal temperature detection devices 1 to 3 according to the above-described first to third embodiments can be optimized in accordance with an environment of a field.

The foregoing automatic learning may be performed only for a predetermined period. For example, only temperature data for one recent year may be automatically learned and data previous to the temperature data may not be used for the learning. The foregoing automatic learning may be started or stopped in response to an instruction from a user.

In the foregoing second and third embodiments, the preprocessor 17 including the learning preprocessor 20 and the detection preprocessor 30 has been described to facilitate understanding. However, the preprocessor 17 may not necessarily be classified into the learning preprocessor 20 and the detection preprocessor 30, and overlapping configurations of the learning preprocessor 20 and the detection preprocessor 30 may be condensed into one configuration. For example, the noise removers 21 and 31 may be condensed into one remover, the difference calculators 22a and 32a may be condensed into one calculator, and the difference calculators 22b and 32b may be condensed into one calculator.

In the foregoing third embodiment, the configuration in which three preprocessors 17, three learners 18, and three determiners 19 are included has been described as an example. However, the number of preprocessors 17, the number of learners 18, and the number of determines 19 are not limited to 3, but may be 2, or may be 4 or more. The configurations of the preprocessors 17, the learners 18, and the determiners 19 may be all mounted on one device or may be mounted on different devices.

The abnormal temperature detection devices 1 to 3 according to the above-described embodiments may be realized by a single device or may be realized by cloud computing via a network. Here, the cloud computing may conform with, for example, the definition (definition recommended by National Institute of Standards and Technology) described in the documents specified in the following uniform resource locator (URL).

http://nvlpubs.nist.gov/nistpubs/Legacy/SP/nistspecialpublication800-145.pdf https://www.ipa.go.jp/files/000025366.pdf

[Supplementary Note]

According to an aspect of the present invention, an abnormal temperature detection device (1 to 3) includes: a temperature acquirer (11) configured to acquire temperature data; a preprocessor (12, 17) configured to perform preprocessing for calculating difference data indicating a difference sequence in the temperature data, generating substituted data in which either of a piece of difference data which is a positive number or a piece of difference data which is a negative number is substituted with zero, and calculating a similarity between the substituted data and reference data obtained from training data in which normality or abnormality has been identified; a learner (13, 18) configured to perform machine learning on the similarity calculated by the preprocessor and output an identification function; and a determiner (14, 19) configured to determine whether temperature data for detection acquired by the temperature acquirer and subjected to the preprocessing by the preprocessor is normal or abnormal by using the identification function.

In the abnormal temperature detection device according to the aspect of the present invention, the preprocessor includes: a data processor (12a, 22a, 24, 32a, 34) configured to calculate the difference data and generate the substitution data; and a similarity calculator (12b, 26a, 35a) configured to calculate the similarity.

In the abnormal temperature detection device according to an aspect of the present invention, the data processor may calculate first-order difference data indicating a first-order difference sequence of the temperature data and second-layer difference data indicating a second-order difference sequence of the temperature data, and generate the substitution data in which one of first-order difference data which is a positive number and first-order difference data which is a negative number is substituted with zero with regard to at least the first-order difference data.

In the abnormal temperature detection device according to an aspect of the present invention, the similarity calculator may calculate the similarity using dynamic time warping.

The abnormal temperature detection device according to an aspect of the present invention may further include: a first preprocessor (20) which is a learning preprocessor; and a second preprocessor (30) which is a detection preprocessor. The first preprocessor may generate the reference data using the substitution data generated by the first preprocessor. The second preprocessor may calculate the similarity between the reference data generated by the first preprocessor and the substitution data generated by the second preprocessor.

In the abnormal temperature detection device according to an aspect of the present invention, the first preprocessor may generate the reference data by averaging the substitution data corresponding to a predefined time over a period of a plurality of times.

In the abnormal temperature detection device according to an aspect of the present invention, a plurality of preprocessors, a plurality of learners, and a plurality of determiners may be provided. The abnormal temperature detection device may further include a general determiner (40) configured to determine whether the temperature data is normal or abnormal based on results of the plurality of determiners.

According to another aspect of the present invention, an abnormal temperature detection method may include: acquiring temperature data by a temperature acquirer (S11); performing, by a preprocessor, preprocessing for calculating difference data indicating a difference sequence in the temperature data, generating substituted data in which either of a piece of difference data which is a positive number or a piece of difference data which is a negative number is substituted with zero, and calculating a similarity between the substituted data and reference data obtained from training data in which normality or abnormality has been identified (S13, S15, S17); performing, by a learner, machine learning on the similarity calculated by the preprocessor and outputting an identification function (S18); acquiring temperature data for detection by the temperature acquirer (S21); performing, by the preprocessor, the preprocessing on the temperature data for detection (S23, S25, S26); and determining, by a determiner, whether the temperature data for detection subjected to the preprocessing by the preprocessor is normal or abnormal by using the identification function (S27).

In the abnormal temperature detection method according to an aspect of the present invention, the preprocessor includes a data processor and a similarity calculator, and the abnormal temperature detection method further includes: calculating the difference data and generating the substitution data by the data processor; and calculating the similarity by the similarity calculator.

The abnormal temperature detection method according to an aspect of the present invention may further include: calculating, by the data processor, first-order difference data indicating a first-order difference sequence of the temperature data and second-layer difference data indicating a second-order difference sequence of the temperature data; and generating, by the data processor, the substitution data in which one of first-order difference data which is a positive number and first-order difference data which is a negative number is substituted with zero with regard to at least the first-order difference data.

The abnormal temperature detection method according to an aspect of the present invention may further include: calculating the similarity by the similarity calculator using dynamic time warping.

In the abnormal temperature detection method according to an aspect of the present invention, the abnormal temperature detection device may include: a first preprocessor which is a learning preprocessor; and a second preprocessor which is a detection preprocessor. The abnormal temperature detection method may further include: generating, by the first preprocessor, the reference data using the substitution data generated by the first preprocessor; and calculating, by the second preprocessor, the similarity between the reference data generated by the first preprocessor and the substitution data generated by the second preprocessor.

The abnormal temperature detection method according to an aspect of the present invention may further include: generating, by the first preprocessor, the reference data by averaging the substitution data corresponding to a pre-defined time over a period of a plurality of times.

In the abnormal temperature detection method according to an aspect of the present invention, a plurality of preprocessors, a plurality of learners, and a plurality of determiners may be provided. The abnormal temperature detection device may further include a general determiner. The abnormal temperature detection method may further include: determining, by the general determiner, whether the temperature data is normal or abnormal based on results of the plurality of determiners.

According to still another aspect of the present invention, a non-transitory computer readable storage medium may store an abnormal temperature detection program executed by a computer. The abnormal temperature detection program may instruct the computer to: acquire temperature data; perform preprocessing for calculating difference data indicating a difference sequence in the temperature data, generating substituted data in which either of a piece of difference data which is a positive number or a piece of difference data which is a negative number is substituted with zero, and calculating a similarity between the substituted data and reference data obtained from training data in which normality or abnormality has been identified; perform machine learning on the calculated similarity and output an identification function; and determine whether temperature data for detection acquired and subjected to the preprocessing is normal or abnormal by using the identification function.

According to the aspects of the present invention, it is possible to obtain the advantage that it is possible to detect an abnormal temperature with high accuracy in consideration of a temporal change in temperature while excluding an influence of an ambient environment.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An abnormal temperature detection device comprising:
a temperature acquirer configured to acquire temperature data from a temperature sensor, the temperature data being time-series data indicating change in temperature over time;
a preprocessor configured to perform preprocessing for calculating difference data indicating a difference sequence in the temperature data to exclude an ambient change in the temperature data, generating substituted data in which either of a piece of difference data which is a positive number or a piece of difference data which is a negative number is substituted with zero, and calculating a similarity between the substituted data and reference data obtained from training data in which normality or abnormality has been identified;
a learner configured to perform machine learning using a pair of the similarity calculated by the preprocessor and an identification label indicating normal or abnormal, and output an identification function;
a determiner configured to determine whether temperature data for detection acquired by the temperature acquirer and subjected to the preprocessing by the preprocessor is normal or abnormal by using the identification function, and an outputter configured to output a determination result of the determiner to a display device to cause the display device to display the determination result.

2. The abnormal temperature detection device according to claim 1,
wherein the preprocessor comprises:
a data processor configured to calculate the difference data and generate the substitution data; and
a similarity calculator configured to calculate the similarity.

3. The abnormal temperature detection device according to claim 2,
wherein the data processor is configured to:
calculate first-order difference data indicating a first-order difference sequence of the temperature data and second-layer difference data indicating a second-order difference sequence of the temperature data; and
generate the substitution data in which one of first-order difference data which is a positive number and first-order difference data which is a negative number is substituted with zero with regard to at least the first-order difference data.

4. The abnormal temperature detection device according to claim 2,
wherein the similarity calculator is configured to calculate the similarity using dynamic time warping.

5. The abnormal temperature detection device according to claim 1, further comprising:
a first preprocessor which is a learning preprocessor; and
a second preprocessor which is a detection preprocessor,
wherein the first preprocessor is configured to generate the reference data using the substitution data generated by the first preprocessor, and
wherein the second preprocessor is configured to calculate the similarity between the reference data generated by the first preprocessor and the substitution data generated by the second preprocessor.

6. The abnormal temperature detection device according to claim 5,
wherein the first preprocessor is configured to generate the reference data by averaging the substitution data corresponding to a predefined time over a period of a plurality of times.

7. The abnormal temperature detection device according to claim 1,
wherein a plurality of preprocessors, a plurality of learners, and a plurality of determiners are provided, and
wherein the abnormal temperature detection device further comprises a general determiner configured to determine whether the temperature data is normal or abnormal based on results of the plurality of determiners.

8. An abnormal temperature detection method performed by an abnormal temperature detection device, the abnormal temperature detection method comprising:
acquiring temperature data from a temperature sensor by a temperature acquirer, the temperature data being time-series data indicating change in temperature over time;
performing, by a preprocessor, preprocessing for calculating difference data indicating a difference sequence in the temperature data to exclude an ambient change in the temperature data, generating substituted data in which either of a piece of difference data which is a positive number or a piece of difference data which is a negative number is substituted with zero, and calculating a similarity between the substituted data and reference data obtained from training data in which normality or abnormality has been identified;
performing, by a learner, machine learning using a pair of the similarity calculated by the preprocessor and an identification label indicating normal or abnormal, and outputting an identification function;
acquiring temperature data for detection by the temperature acquirer;
performing, by the preprocessor, the preprocessing on the temperature data for detection; and
determining, by a determiner, whether the temperature data for detection subjected to the preprocessing by the preprocessor is normal or abnormal by using the identification function; and
outputting, by an outputter, a determination result of the determiner to a display device to cause the display device to display the determination result.

9. The abnormal temperature detection method according to claim 8,
wherein the preprocessor comprises a data processor and a similarity calculator, and
wherein the abnormal temperature detection method further comprises:
calculating the difference data and generating the substitution data by the data processor; and
calculating the similarity by the similarity calculator.

10. The abnormal temperature detection method according to claim 9, further comprising:
calculating, by the data processor, first-order difference data indicating a first-order difference sequence of the temperature data and second-layer difference data indicating a second-order difference sequence of the temperature data; and
generating, by the data processor, the substitution data in which one of first-order difference data which is a positive number and first-order difference data which is a negative number is substituted with zero with regard to at least the first-order difference data.

11. The abnormal temperature detection method according to claim 9, further comprising:
calculating the similarity by the similarity calculator using dynamic time warping.

12. The abnormal temperature detection method according to claim 8,
wherein the abnormal temperature detection device comprises:
a first preprocessor which is a learning preprocessor; and
a second preprocessor which is a detection preprocessor,
wherein the abnormal temperature detection method further comprises:
generating, by the first preprocessor, the reference data using the substitution data generated by the first preprocessor; and
calculating, by the second preprocessor, the similarity between the reference data generated by the first preprocessor and the substitution data generated by the second preprocessor.

13. The abnormal temperature detection method according to claim 12, further comprising:
generating, by the first preprocessor, the reference data by averaging the substitution data corresponding to a predefined time over a period of a plurality of times.

14. The abnormal temperature detection method according to claim 8, wherein a plurality of preprocessors, a plurality of learners, and a plurality of determiners are provided, wherein the abnormal temperature detection device further comprises a general determiner, and wherein the abnormal temperature detection method further comprises:
    determining, by the general determiner, whether the temperature data is normal or abnormal based on results of the plurality of determiners.

15. A non-transitory computer readable storage medium storing an abnormal temperature detection program executed by a computer, the abnormal temperature detection program instructing the computer to:
    acquire temperature data from a temperature sensor, the temperature data being time-series data indicating change in temperature over time;
    perform preprocessing for calculating difference data indicating a difference sequence in the temperature data to exclude an ambient change in the temperature data, generating substituted data in which either of a piece of difference data which is a positive number or a piece of difference data which is a negative number is substituted with zero, and calculating a similarity between the substituted data and reference data obtained from training data in which normality or abnormality has been identified;
    perform machine learning using a pair of the calculated similarity and an identification label indicating normal or abnormal, and output an identification function;
    determine whether temperature data for detection acquired and subjected to the preprocessing is normal or abnormal by using the identification function; and
    output a determination result representing whether the temperature data for detection is normal or abnormal to a display device to cause the display device to display the determination result.

* * * * *